United States Patent [19]

Carrier

[11] Patent Number: 5,134,024
[45] Date of Patent: Jul. 28, 1992

[54] REINFORCING PLY FOR A PENUMATIC TIRE CONTAINING REINFORCING FIBERS IN A SINUSOIDAL PATTERN

[75] Inventor: Gilles Carrier, Surat, France

[73] Assignee: Compagnie Generale des Etablissements Michelin - Michelin & Cie, Clermont-Ferrand, France

[21] Appl. No.: 569,394

[22] Filed: Aug. 17, 1990

Related U.S. Application Data

[62] Division of Ser. No. 275,097, Nov. 21, 1988, Pat. No. 4,981,542.

[30] Foreign Application Priority Data

Nov. 30, 1987 [FR] France ................ 87 16690

[51] Int. Cl.$^5$ .......... B60C 9/04; D04H 3/00; B32B 5/06; B32B 5/00
[52] U.S. Cl. ................ 428/295; 152/451; 152/526; 152/527; 152/533; 152/562; 156/117; 156/177; 156/178; 156/361; 156/397; 156/440; 428/292; 428/294; 428/297; 428/302; 428/303
[58] Field of Search ........... 428/294, 295, 292, 303, 428/297, 302; 152/526, 562, 451, 533; 156/117, 177, 178, 361, 397, 440

[56] References Cited

U.S. PATENT DOCUMENTS

| | | | |
|---|---|---|---|
| 2,828,795 | 4/1958 | Hartstein | 156/440 |
| 3,010,865 | 11/1961 | Porter | 156/181 X |
| 3,095,338 | 6/1963 | Romanin | 156/181 X |
| 3,589,426 | 6/1971 | Varner | 152/361 |
| 3,700,012 | 10/1972 | Alderfer | 156/436 X |
| 3,778,329 | 12/1973 | Alderfer | 428/295 |
| 4,061,524 | 10/1977 | Tolan | 156/397 |
| 4,820,143 | 4/1989 | Eroskey et al. | 156/440 X |

FOREIGN PATENT DOCUMENTS 6816353 5/1970 Netherlands ............ 156/181
2085494 7/1982 United Kingdom .

Primary Examiner—George F. Lesmes
Assistant Examiner—James D. Withers
Attorney, Agent, or Firm—Brumbaugh, Graves, Donohue & Raymond

[57] ABSTRACT

A device (1) making it possible to apply at least one thread (2) to a support (3) and characterized by the following features:

it has a front clamp (4) and a rear clamp (5) along a direction of advance ($F_1$);

it has means (6, 7) for opening and closing said clamps (4, 5);

it has means (8) permitting the displacement of the rear clamp (5) in the direction of advance ($F_1$) or in a direction ($F_2$) opposite to the direction of advance ($F_1$); and it has means (9) for displacing the thread (2) in transverse directions.

a reinforcing ply for a pneumatic tire having reinforcing threads applied on a support in a sinuous pattern having vertices.

4 Claims, 7 Drawing Sheets

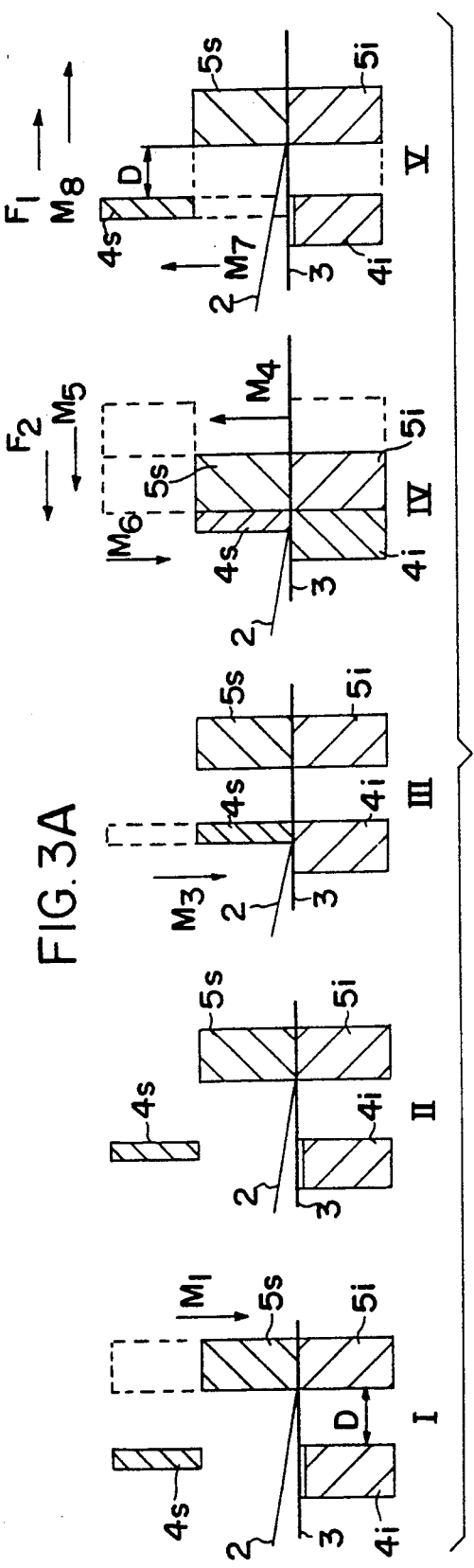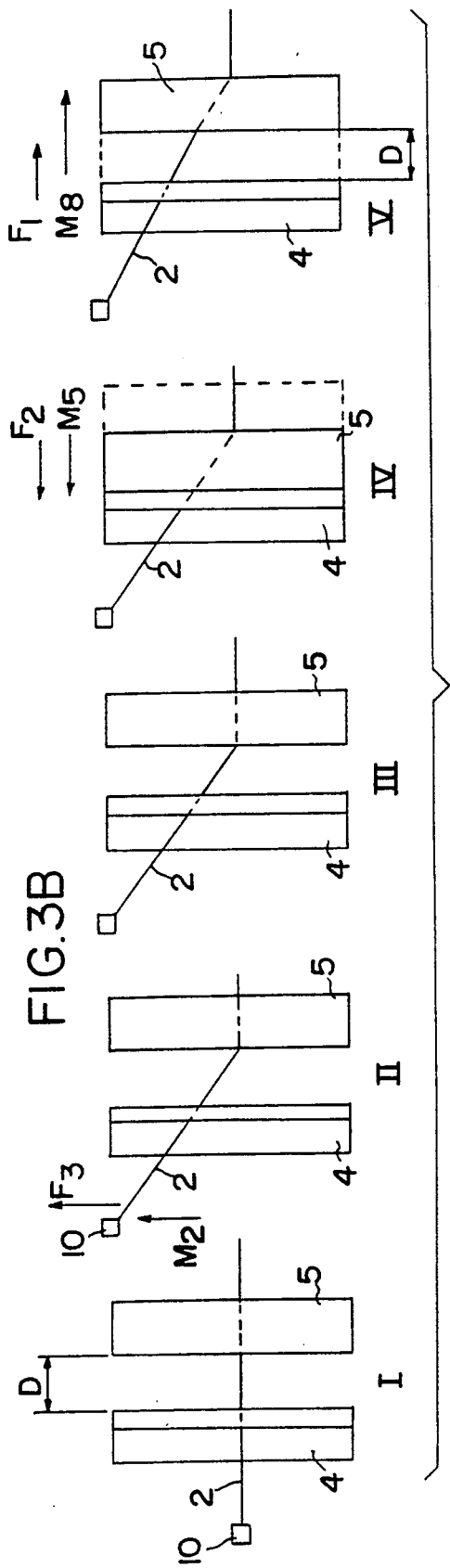
FIG.3A
FIG.3B

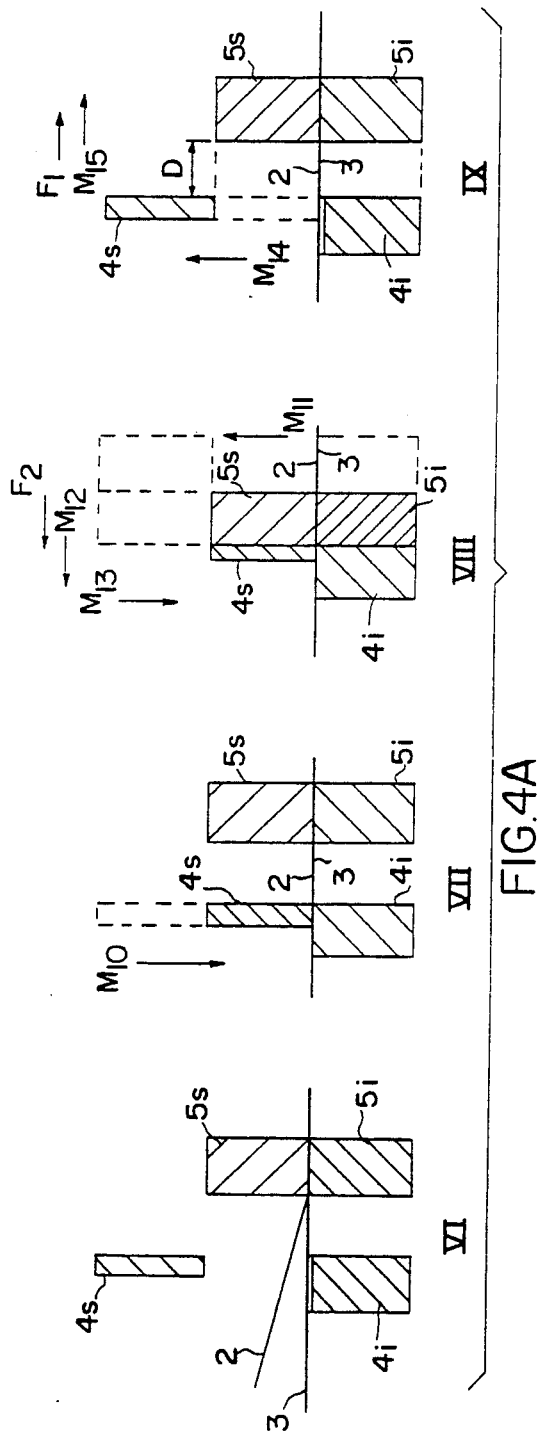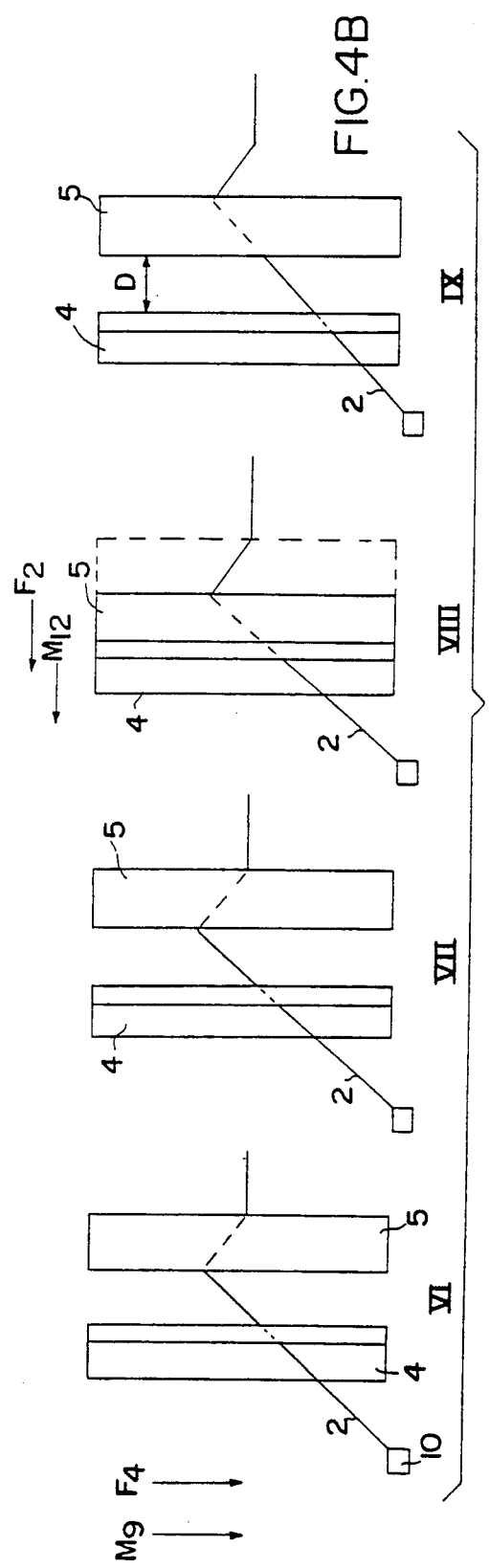

REINFORCING PLY FOR A PENUMATIC TIRE CONTAINING REINFORCING FIBERS IN A SINUSOIDAL PATTERN

This application is a division of application Ser. No. 275,097, filed on Nov. 21, 1988, now U.S. Pat. No. 4,981,542.

BACKGROUND OF THE INVENTION

The present invention relates to devices which make it possible to apply threads on supports, particularly supports of plastic material or rubber, these devices permitting for example, the production of reinforcement plies, particularly reinforcement plies for pneumatic tires. In particular, the invention relates to the devices which make it possible to apply these threads while imparting to them a sinuous shape.

Devices which make it possible to apply threads on a support while imparting a sinuous shape to them are described, for example, in the following Patents or patent applications: French 2 042 859. French 2 325 497, French 2 501 126, Soviet Union 704 816, PCT 81/1151.

These devices have at least one of the following drawbacks:

(a) complicated nature of the devices giving rise to frequent breakdowns or incurring costly and frequent maintenance;

(b) lack of precision in the placing of the threads, so that the plies obtained have a heterogeneous geometry and therefore have physical characteristics which vary along their lengths.

The object of the invention is to avoid these drawbacks. Therefore, the device in accordance with the invention which makes it possible to apply at least one thread onto the surface of a support is characterized by the following features:

(a) it has two clamps arranged in an invariable order in a direction called the "direction of advance", the first clamp being called the "front clamp" and the second clamp being called the "rear clamp";

(b) the device comprises means which make it possible to open and close these clamps in such a manner that they are without contact with the support and the thread when they are open and that they are in contact with the support and the thread when they are closed;

(c) the arrangement of the front clamp is such that said clamp experiences practically only movements capable of opening or closing it;

(d) the device has means which make it possible to displace the rear clamp in the direction of advance when it is closed, so as to cause the support and the thread to advance in said direction, the rear clamp then moving away from the front clamp, which is open;

(e) the device comprises means which make it possible to displace the rear clamp in the direction opposite the direction of advance when said clamp is open, the rear clamp then approaching the front clamp which is closed;

(f) the device has means which make it possible to displace the thread in directions transverse to the direction of advance, the front clamp being arranged between said means and the rear clamp, these means being so arranged that upon this transverse displacement:

the portion of thread displaced extends from the rear clamp to upstream of the front clamp;

the portion of thread displaced is not in contact with the support;

the front clamp is open and the rear clamp closed.

The invention also concerns the process carried out in this device. This process, which makes it possible to apply at least one thread to the surface of a support, is characterized by the following features:

(a) two clamps are used which are arranged in an invariable order in one direction, called the "direction of advance", the first clamp being referred to as the "front clamp" and the second clamp being referred to as the "rear clamp";

(b) when the clamps are opened they are not in contact either with the support or with the thread and when these clamps are closed they are in contact both with the support and with the thread;

(c) the front clamp is caused to experience practically only movements which are capable of opening or closing it;

(d) after having closed the rear clamp, it is displaced in the direction of advance in such a manner as to cause the support and the thread to advance in said direction, the rear clamp moving away from the front clamp which has been previously open;

(e) after having opened the rear clamp, it is displaced in the direction opposite the direction of advance so as to bring the rear clamp towards the front clamp which has been previously closed;

(f) after having opened the front clamp and closed the rear clamp, the thread is displaced in directions transverse to the direction of advance in such a manner that the portion of thread displaced extends from the rear clamp to upstream of the front clamp without the portion of thread displaced being in contact with the support.

The invention also concerns assemblies obtained with this device and process, these assemblies being, in particular, reinforcing plies.

The invention also concerns a reinforcing ply having reinforcement threads applied on a support, said ply being characterized by the following features:

(a) it comprises a plurality of threads over its width;

(b) the threads have a sinuous shape with vertices;

(c) the amplitude of the undulation of each thread is less than the width of the ply;

(d) for each thread the variation in the displacement ratio T is at most equal to 5% plus or minus with respect to any nominal value $T_n$, the displacement ratio being defined by the relationship:

$$T = L/D$$

L being the recti/linear distance between two successive vertices and 2D being the recti/linear distance between two vertices connected by the thread via another vertex.

The reinforcing plies in accordance with the invention are used to produce various articles, for instance tubes, membranes, belts and pneumatic tires.

The expression "thread" is to be taken in a very general sense. A thread may be a "single thread" formed, for instance, of one or more filaments. When this single thread is formed of a single filament it is referred to as a "monofilament" and when the single thread is formed of a plurality of filaments it is called a "multifilament."

A thread may furthermore itself be an assembly of single threads. By way of example, such an assembly is referred to as a "plied thread" when it is formed of a plurality of single threads connected by a single twisting operation, while such an assembly is referred to as a "cabled thread" when it is formed of several threads at least one of which is a plied thread united by one or more twisting operations.

The invention will be easily understood by means of the non-limitative examples which follow and the diagrammatic figures concerning these examples.

In the drawings:

FIGS. 3 and 4 show the phases I through V and VI through IX, respectively, of the kinematic movement of the clamps of the device shown in FIGS. 1 and 2, each of these figures having two views, a sectional elevation A and a plan view B;

Figure 1:
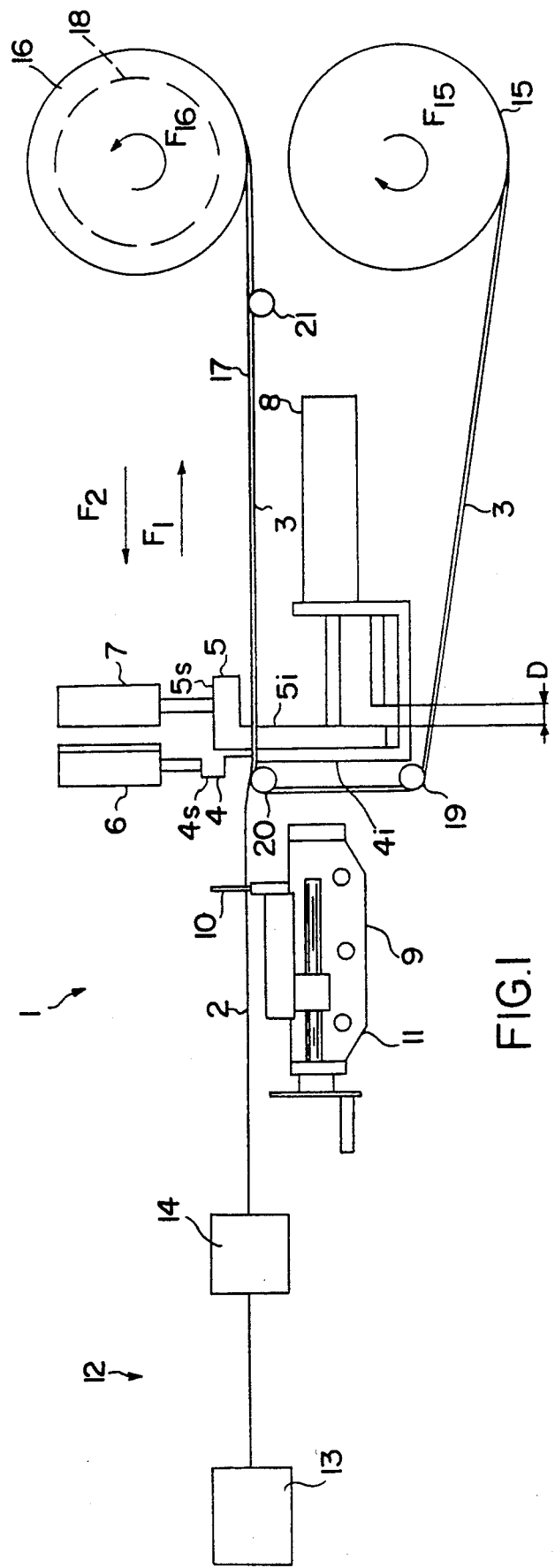
FIG. 1 shows in vertical section a device in accordance with the invention.
Figure 2:
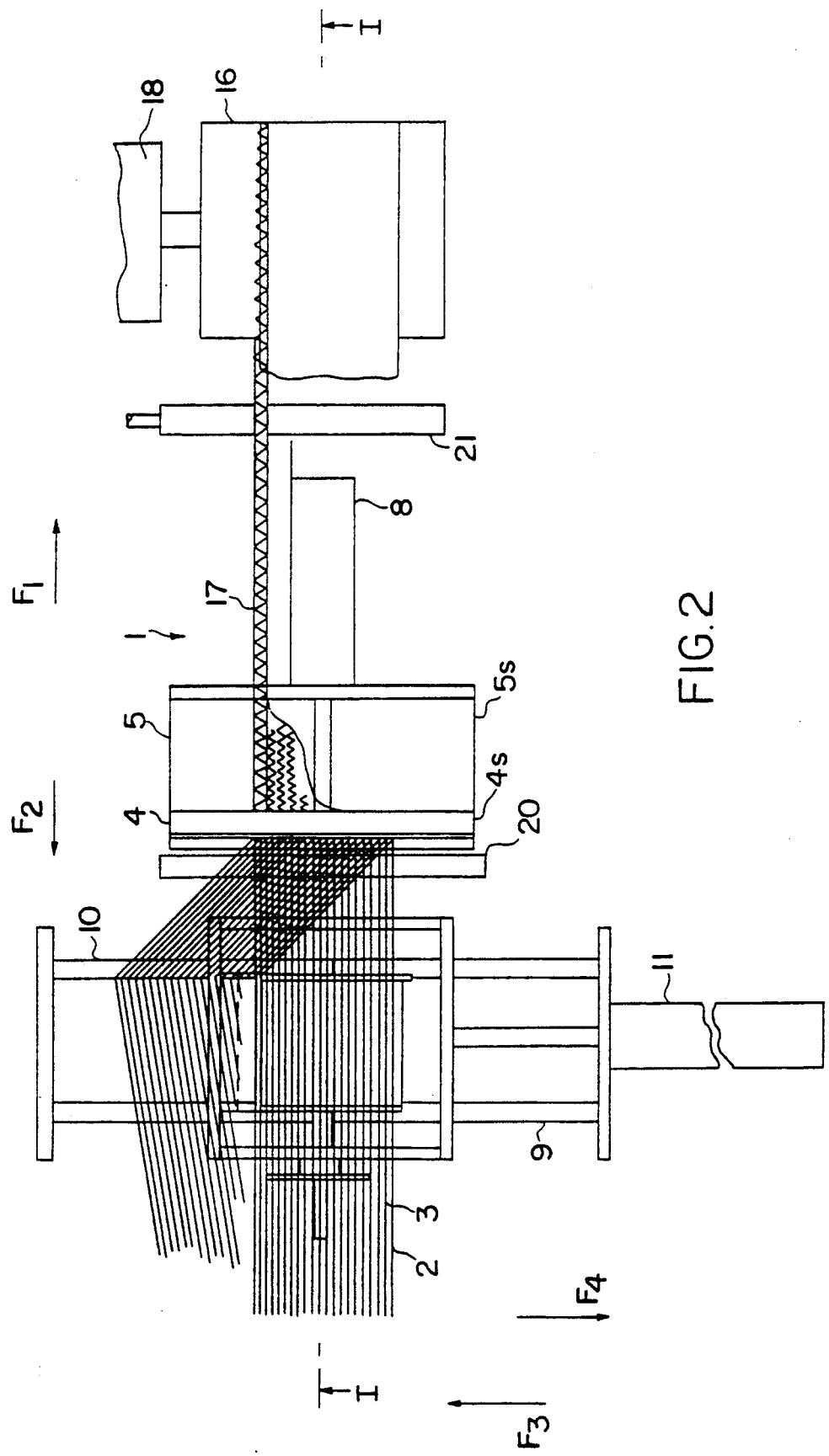
FIG. 2 shows in top view the device of FIG. 1.

FIGS. 1 and 2 show a device in accordance with the invention, this device 1 making it possible to apply threads 2 onto the surface of a support 3. FIG. 1 is a vertical section through the device 1 and FIG. 2 is a top view of this device 1, the section of FIG. 1 being indicated diagrammatically by the section-line I—I in FIG. 2. The device 1 comprises two clamps 4, 5 arranged in this order along the direction referred to as the "direction of advance", indicated diagrammatically by the arrow $F_1$ in FIGS. 1 and 2. The clamp 4 is referred to as the "front clamp" and the clamp 5 as the "rear clamp."

The device 1 has means 6, 7 which make it possible to open and close these clamps 4, 5. The means 6, 7 consist of cylinder-piston units, the unit 6 making it possible to open or close the front clamp 4 and the unit 7 making it possible to open or close the rear clamp 5. The clamps 4, 5 are without contact with the threads 2 and the support 3 when they are open and they are in contact with the threads 2 and the support 3 when they are closed.

The front clamp 4 experiences only movements capable of opening or closing it, these movements being vertical, practically perpendicular to the surface of the support 3, this surface being practically horizontal in the vicinity of the clamps 4 and 5.

The device 1 has means 8 which make it possible to displace the rear clamp 5 in the direction of advance $F_1$ when said clamp 5 is closed so as to advance the support 3 and the threads 2 in said direction $F_1$, the rear clamp 5 thus moving away from the front clamp 4 which is then open.

This device 8 is formed, for instance, of a cylinder-piston unit. This same unit 8 makes it possible to displace the rear clamp 5 in the direction opposite the direction of advance $F_1$, that is to say in the direction towards the front clamp 4 when the front clamp 4 is closed and the rear clamp 5 is open, this direction being indicated diagrammatically by the horizontal arrow $F_2$.

The device 1 has means 9 which make it possible to displace the threads 2 in transverse directions with respect to the direction of advance $F_1$. These transverse directions are indicated diagrammatically by the opposite horizontal arrows $F_3$, $F_4$ (FIG. 2), these arrows being perpendicular to the arrows $F_1$, $F_2$. These means of transverse displacement 9 comprise a guide 10 for the threads 2, for instance a comb in contact with the threads 2 and connected to a cylinder-piston unit 11, this comb 10 being shown perpendicular to the direction of advance $F_1$.

The device 1 has a feed system 12 for the threads 2 (FIG. 1), this system 12 being located upstream of the comb 10 and clamps 4, 5 with respect to the direction of advance $F_1$. This system 12 has, for instance, an unwinding creel 13 having as many bobbins as there are threads 2, and an apparatus 14 which makes it possible to compensate for the variations in length of the threads 2 due to the transverse displacement caused by the means 9. The creel 13 and the apparatus 14 can be developed in accordance with principles well-known in the industry and we do not deem it necessary to describe these apparatus 13 and 14 in detail, in order to simplify matters.

The device 1 has a bobbin 15 on which the support 3 is wound and a bobbin 16 which makes it possible to wind-up the ply 17 formed by the support 3 and the threads 2 applied to the surface of the support 3. The bobbin 16 is driven in rotation in the direction indicated by the arrow $F_{16}$ by the motor 18, and the rollers 19, 20, 21 permit the unwinding of the support 3 when the bobbin 15 turns in the direction of the arrow $F_{15}$, the support 3 being tensioned between the roller 20 and the roller 21 upon its passage in the clamps 4, 5. By way of example, the clamp 4 has an upper jaw 4s and a lower jaw 4i and the clamp 5 has an upper jaw 5s and a lower jaw 5i, the arrangement of these clamps being such that the cylinder-piston unit 6 actuates only the upper jaw 4s and the cylinder-piston unit 7 actuates only the upper jaw 5s, the lower jaws 4i, 5i being without vertical movement. The jaws 4s, 4i, 5s, 5i are preferably oriented in a direction perpendicular to the arrow $F_1$. The rollers 20, 21 are arranged in such a manner that the support 3 is stretched between these rollers when the clamps 4, 5 are open, without contact with the jaws 4s, 4i, 5s, 5i, being slightly above the lower jaws 4i, 5i, for instance by about 2 mm. The support 3 comes into contact with the lower jaws 4i, 5i when the upper jaws 4s, 5s apply themselves to it under the action of the cylinder-piston units, 6, 7. The kinematics of the clamps 4, 5 is shown in FIGS. 3, 4 in the form of nine successive phases marked I to IX, FIG. 3 showing phases I to V and FIG. 4 showing phases VI to IX.

FIGS. 3, 4 comprise two parts, the part A showing the phases in vertical section and the part B showing these phases seen from above. In these FIGS. 3 and 4, the various movements are represented by vectors marked by the letter M followed by a number, and the initial positions of the clamps 4, 5 are shown in dashed line. For simplicity, only the clamps 4, 5, a single thread 2, the support 3 and a portion of the comb 10 have been shown in FIGS. 3, 4.

The device 1 operates as follows:

Phase I: The start of this phase I corresponds to the initial state upon the starting up of the process. The clamps 4, 5 are open and separated from each other by the distance D; the threads 2 have not undergone any transverse displacement. The rear clamp 5 then closes (movement M₁) in such a manner as to apply the threads 2 to the support 3.

Phase II: The threads 2 are displaced transversely in the direction of the arrow F₃ (movement M₂) by the means 9, due to a displacement of the comb 10 under the action of the cylinder-piston unit 11. The displaced portion of the threads extends from the rear clamp 5 to upstream of the front clamp 4 between the rear clamp 5 and the comb 10. This portion passes through the open front clamp 4 without touching it, this portion being without contact with the support 3.

Phase III: The front clamp 4 is closed (movement M₃); the threads 2 displaced in phase II are then applied to the surface of the support 3 between the clamps 4, 5.

Phase IV: The rear clamp 5 opens (movement M₄); it then applies itself against the front clamp 4 in the direction of the arrow F₂, (movement M₅) and then closes, remaining applied against the clamp 4 (movement M₆).

Phase V: The front clamp 4 opens (movement M₇) and the rear clamp 5, which is still closed, moves longitudinally in the direction of advance F₁ (movement M₈) until the distance between the clamps 4, 5 is equal to D which causes the displacement of the ply 17 in the direction F₁. The motor 18 is a pneumatic motor which is constantly under pressure and the advance of the ply 17 in the direction F₁ causes the rotation of the bobbin 16 and therefore the winding onto this bobbin of a length of ply 17 equivalent to D. Furthermore, the bobbin 15 and the device 13, 14 which are actuated by the traction exerted by the rear clamp 5 on the threads 2 and the support 3 permit an equivalent length of advance of threads 2 and of support 3.

Phase VI: The threads 2 are then displaced in the other transverse direction F₄ due to a displacement of the comb 10 (movement M₉), without there being contact between the displaced portion of the threads, 2 and the support 3 or the open front clamp 4. This transverse displacement is therefore similar to that which is effected in phase II, but in the opposite direction.

Phase VII: The front clamp 4 closes (movement M₁₀); the threads 2 displaced in phase VI are then applied to the surface of the support 3 between the clamps 4, 5 in a manner similar to phase III.

Phase VIII: The rear clamp 5 opens (movement M₁₁) and it then applies itself against the front clamp 4 in the direction indicated by the arrow F₂ (movement M₁₂), whereupon it closes, remaining applied against the clamp 4 (movement M₁₃) in a manner similar to phase IV.

Phase IX: The front clamp 4 opens (movement M₁₄) and the rear clamp 5, which is still closed, moves longitudinally in the direction of advance F₁ (movement M₁₅) until the distance between the clamps 4, 5 is equal to D, which causes the displacement of the ply 17 in the direction F₁ as well as a new arrival of threads 2 and of support 3, the motor 18 then permitting the winding of the ply 17 on the bobbin 16. Phase IX is therefore similar to phase V.

The cycle then starts again in phase II in order to describe, in succession, phases II to IX and an so on. Each time that a cylinder-piston unit 6, 7, 8, 11 has completed its stroke in the cycle previously described, it actuates a detector which brings about the return of said cylinder-piston unit or the movement of another cylinder-piston unit in accordance with an automatic program run by a pneumatic sequencer of the device 1 which is therefore without mechanical connection (for instance, cams) between these cylinder-piston units. For purposes of simplification this sequencer has not been shown in the drawing.

Figure 5:
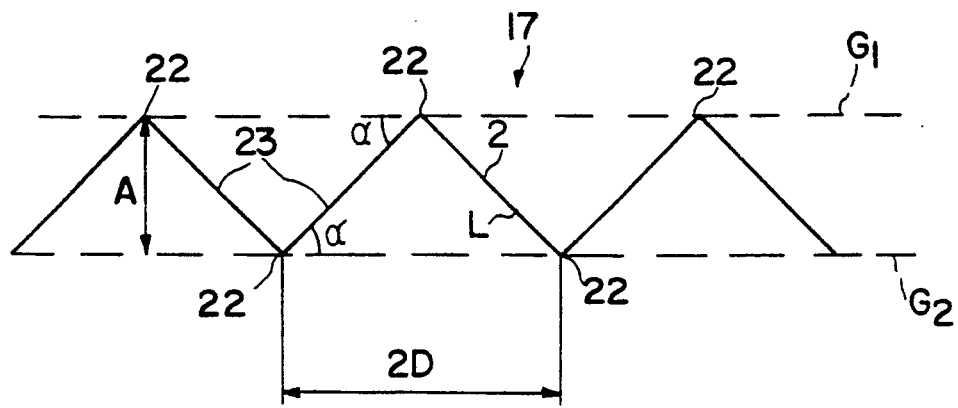
FIG. 5 shows, in top view, a portion of a thread of a ply obtained with the device shown in FIGS. 1 and 2.

The device 1 which operates as previously described makes it possible to produce the ply 17 comprising the support 3 to the surface of which the threads 2 are applied in the form of sinuous lines. Only a portion of this ply 17 has been shown in FIG. 2. FIG. 5 is a top view of a portion of one of these threads 2 of the ply 17. This thread 2 is characterized by a broken line of vertices 22. L represents the length of thread 2 between two successive vertices 22, that is to say, the length of a rectilinear segment 23 of the broken line and 2D represents the rectilinear distance between two vertices 22 connected by two segments 23, that is to say, the rectilinear distance between two vertices 22 connected by the thread 2 via an intermediate vertex 22. D corresponds to the distance between the clamps 4, 5 in the phases previously described. By definition the displacement ratio T is given by the relationship $$T = L/D$$

The invention covers the cases in which the thread 2 describes a sinuous shape which does not comprise a rectilinear linear segment, in which case the rectilinear length L corresponding to the straight-line segment 23 between two successive vertices 22 does not correspond precisely to the shape of the thread 2 between these two vertices but the displacement ratio T is still given by the formula $$T = L/D$$

In FIG. 5, G₁ and G₂ each represents a straight line passing through one vertex 22 out of two of the line described by the thread 2, G₁ and G₂ having a longitudinal direction which is parallel to the direction of advance F₁ upon the production of the ply 17. The thread 2 describes a sinuous shape between these two lines G₁, G₂, 2D being the rectilinear distance between two successive vertices 22 on the same straight line G₁ or G₂, A representing the distance between the two straight lines G₁, G₂, that is to say, the amplitude of the undulations described by the thread 2.

In FIG. 5 each straight-line segment 23 forms an acute angle α with the straight lines G₁, G₂. When the thread 2 has a non-rectilinear sinuous shape between the vertices 22 corresponding to this segment 23, the angle α represents the average direction of the thread 2 between these vertices 22.

The invention has the following advantages:

The device 1 employs simple movements for the clamps 4, 5; it is therefore economical to produce and use.

The placing of the threads 2 on the support 3 is effected in very precise fashion as a result of the sequential step-by-step operation of the device 1 and as a result of the fact that the transverse displacement of the threads 2 and their application to the support 3 are effected when the support 3 is stationary. This permits great geometrical uniformity for the arrangement of the threads 2 on the support 3 with a displacement ratio T defined precisely for all the threads 2. Thus for each thread 2 the variation in the displacement ratio T with respect to any nominal value $T_n$ is at most equal to 5% plus or minus, and preferably at most equal to 3% plus or minus, that is to say, the length L and the distance 2D are practically constant for a given thread 2, and the acute angle α formed by any segment 23 with the straight lines $G_1$, $G_2$, that is to say with the longitudinal direction, is practically constant over the entire length of the thread 2, three successive vertices 22 forming practically an isosceles triangle for each thread 2. The ply 17 thus produced is therefore characterized by great uniformity of its mechanical properties over its entire length. The nominal displacement ratio $T_n$ may vary within wide limits from one ply to the next, this ratio $T_n$ varying preferably from 1 to 3.

The invention makes it possible, in particular, to maintain this precision when the distance between neighboring threads 2 is zero or small, for instance less than 1.5 mm, end when the distance D is small, for instance between 5 and 10 mm for textile threads the diameter of which varies between 0.2 and 2 mm, independently of the nominal ratio $T_n$.

Figure 6:
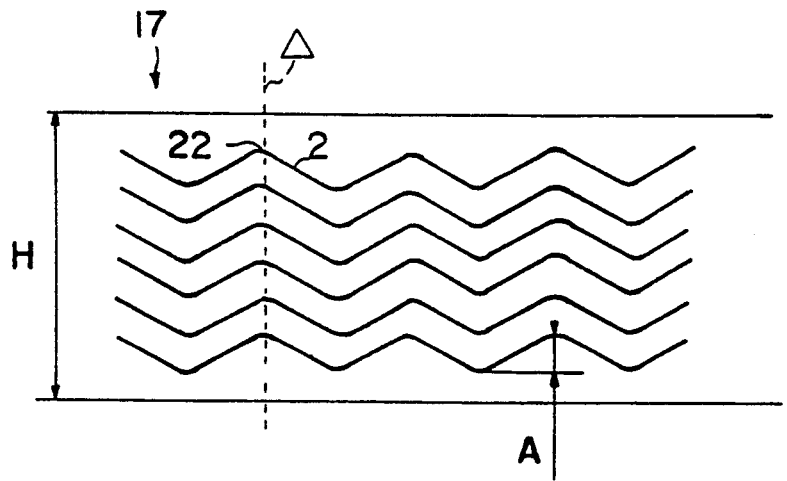
FIG. 6 shows, in top view, a portion of a ply in accordance with the invention.

FIG. 6 is a top view of a portion of ply 17 in accordance with the invention, this ply 17 having, for instance, six threads 2 undulated in the same manner, the nominal displacement ratio $T_n$ being the same for all the threads 2. The amplitude A of the undulation of each thread 2 is less than the width H of the ply 17, and the variation in the displacement ratio T is at most equal to 3% plus or minus, referred to the arbitrary nominal value $T_n$ for all the threads 2. Since the clamps 4, 5 are oriented perpendicular to the arrow $F_1$, that is to say, perpendicular to the longitudinal direction of the ply 17, which is the average direction of the threads 2, the vertices 22 of all these threads 2 are arranged along straight lines Δ perpendicular to this longitudinal direction, one such straight line Δ being shown in dashed line in FIG. 6.

In another embodiment, the ply 17 has the following properties:

Support 3: Non-vulcanized rubber strip of a thickness of 0.5 mm and a width of 192 mm;

Threads 2: Number of threads equals 96; these textile threads are cabled polyamide threads of a diameter of 0.8 mm, the distance between the axes of two neighboring threads 2 being 2 mm.

Nominal displacement ratio $T_n$: 1.93; the nominal displacement ratio $T_n$ is the same for all of the threads 2; for each thread 2 the ratio T does not vary by more than 2% plus or minus from said nominal value Tn with the relationship $1.89 \leq T \leq 1.97$;

Distance D: 7.5 mm.

The speed of production of the ply 17 in the device 1 is 10 meters per hour for this example.

The nominal displacement ratio $T_n$ is constant in this example but the invention makes it possible to vary this ratio $T_n$ along the threads by effecting a variable transverse displacement along the threads. This is obtained, for instance, by inclining the comb 10 with respect to the longitudinal direction, as described further below.

The plies in accordance with the invention are used, in particular, to reinforce pneumatic tires, for instance in the crown or in the side walls. It may be advantageous to decrease or do away, at least in part, with the sinuous shape of the threads upon the shaping of these tires on a drum, the nominal displacement ratio Tn then decreasing and possibly assuming a value of 1.

Figure 7:
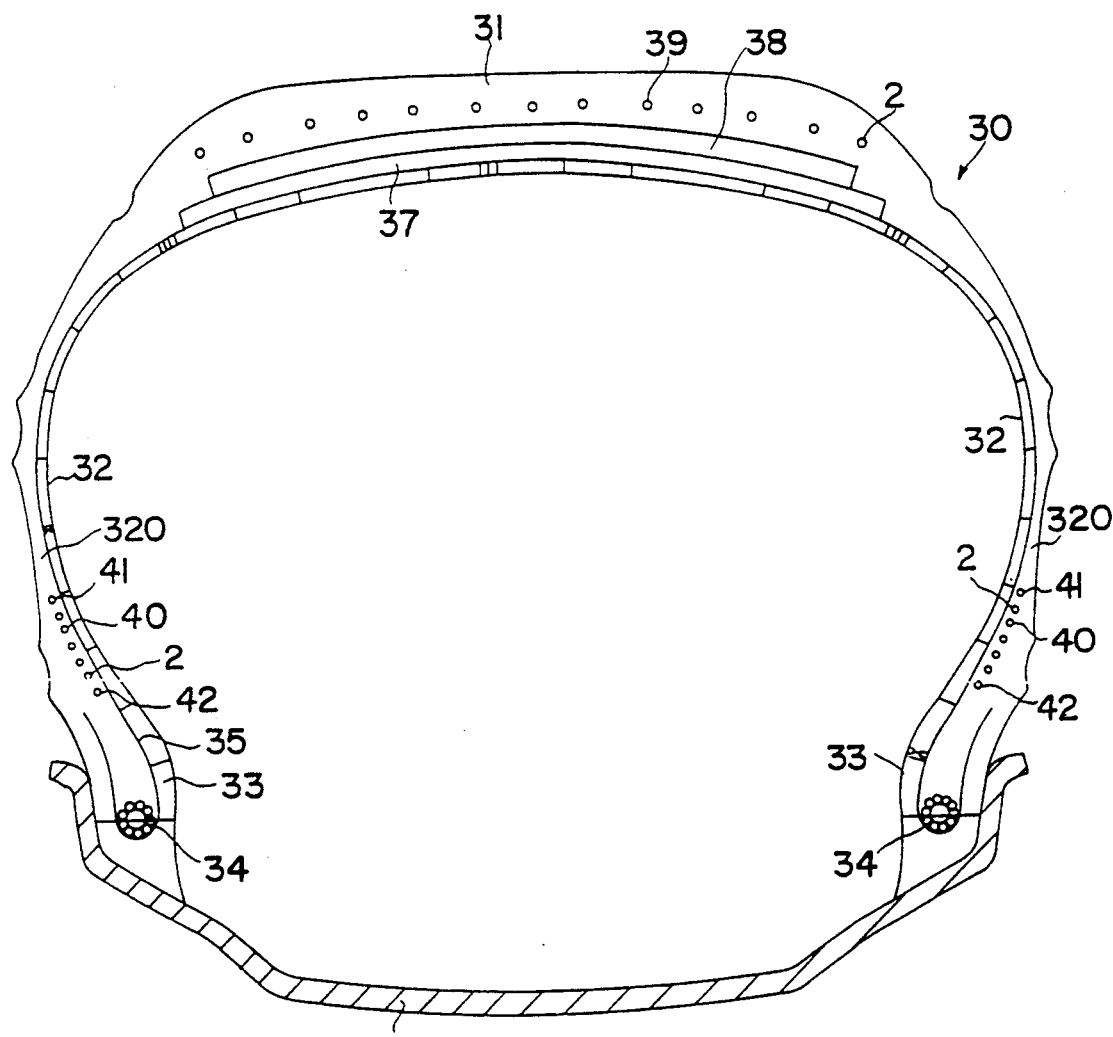
FIG. 7 shows, in radial section, a pneumatic tire made with three reinforcing plies in accordance with the invention.

FIG. 7 shows, for instance, in radial section a pneumatic tire having such plies in which the sinuous shape of the threads has disappeared after shaping.

This tire 30 has a crown 31, two side walls 32 and two beads 33 each reinforced by a bead wire 34, these bead wires 34 being connected by a radial carcass ply 35. The tire 30 is mounted on the rim 36. The crown 31 is reinforced by two plies 37, 38 in known manner. Above these crown reinforcement plies 37, 38 there is a reinforcement ply 39 which surrounds the plies 37, 38 in the manner of a hoop. The threads 2 of this ply 39 are oriented in the longitudinal direction of the tire 30, that is to say, they are arranged in circles, each of these circles being located in a plane perpendicular to the axis of rotation of the tire 30, this axis, which is therefore the axis of these circles, not having been shown in the drawing for reasons of simplification.

The ply 39 is obtained after shaping of a ply 17 obtained in accordance with the invention. This shaping is produced upon the shaping of the raw tire 30 on a drum of known type and it causes the sinuous shape of the threads 2 to disappear. The tire is then vulcanized. When this ply 39 is arranged along a plane, for observation, the threads 2 are practically rectilinear and parallel to each other, the nominal displacement ratio $T_n$ being then equal to 1.

Due to the great precision of the displacement ratio T for the ply 17, the latter, after shaping, produces a very uniform ply 39 which is characterized therefore by well-defined mechanical properties in accord with what is desired.

The tire 30 furthermore has two identical protective plies 40. Each of these plies 40 is arranged in a side wall 32 within the rubber 320 of said side wall, said rubber being located on the outer side of the carcass 35. Each of these plies 40 has threads 2, each of these threads 2 being located along a circle the axis of which is the axis of rotation of the tire 30, that is to say, these threads are directed along the longitudinal direction of the tire 30. For each ply 40, the thread 2 furthest away from the axis of rotation of the tire 30 is marked 41 and the thread 2 closest to the axis of said tire bears the reference number 42. For each ply 40, the thread 41 furthest from the rim 36 is therefore arranged along the circle of largest radius and the thread 42 closest to the rim 36 is therefore arranged along the circle of smallest radius. Each of these plies 40 is made from a ply in accordance with the invention in which the shape of the threads 2 was caused to disappear upon the shaping, as in the case of the ply 39.

Figure 8:
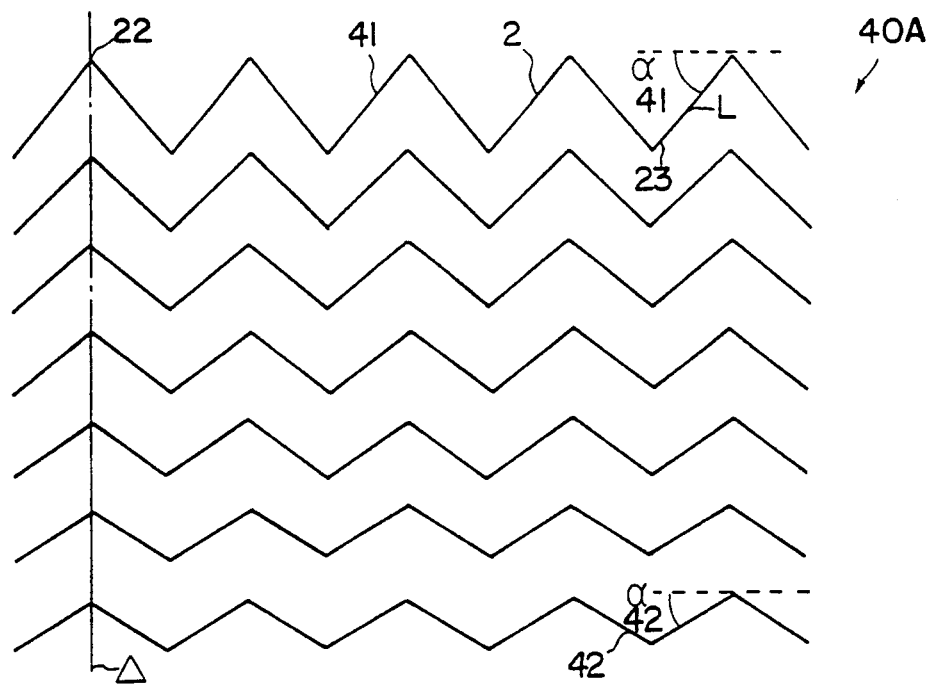
FIG. 8 shows, in top view, another ply in accordance with the invention, used to produce the pneumatic tire shown in FIG. 7.

FIG. 8 shows, in top view, a portion of the ply 40A corresponding to a ply 40 before shaping. For simplicity in the drawing, this ply 40A has been limited to seven threads 2.

The nominal displacement ratio $T_n$ varies from one thread 2 to the next in the case of this ply 40A. The thread 41 has the highest ratio $T_n$ and the thread 42 the smallest ratio $T_n$, the threads 41, 42 being the end threads of this ply 40.

The threads 2 which are arranged between these end threads 41, 42 have a ratio $T_n$ which decreases from thread 41 to thread 42. All the threads 2 of the ply 40A in this case also have their vertices 22 arranged along straight lines Δ perpendicular to the longitudinal direction of the ply 40A, this longitudinal direction being the average direction of the threads 2. Such a straight line Δ is shown in FIG. 8.

Figure 9:
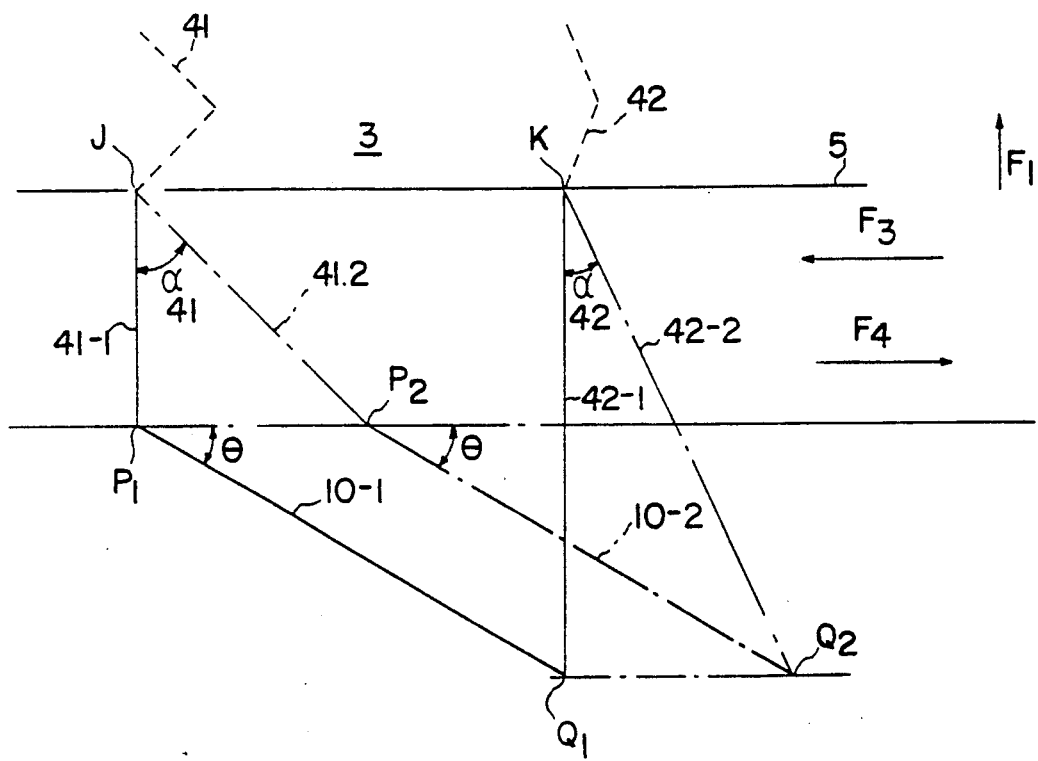
FIG. 9 shows, in top view, a part of the device shown in FIGS. 1 and 2 upon the production of the ply shown in FIG. 8.

The ply 40A is produced, for instance, with the device 1 in the following manner. FIG. 9 shows, in top view, a part of the device 1 upon this production. The closed rear clamp 5 is indicated diagrammatically by s straight line; the open front clamp 4 has not been shown.

In the initial position, the thread 41 has the reference number 41-1 and the thread 42 the reference number 42-1. The thread guide 10, for instance a comb bearing the reference number 10-1, at the time of this initial position is inclined by the angle $\theta$ with respect to the transverse direction which is parallel to the arrows $F_3$, $F_4$.

The comb 10 has two ends P, Q marked $P_1$, $Q_1$ in the initial position. The thread 41-1 passes through the end $P_1$ and the thread 42-1 passes through the end $Q_1$. Furthermore, the rear clamp 5 applies the thread 41-1 to the support 3 at the point J and the thread 42-1 at the point K.

The comb 10 is then displaced transversely in the direction indicated by the arrow $F_4$, this comb being at all times inclined by the angle $\theta$ with respect to the transverse direction. The comb 10 then assumes the position 10-2, the ends P, Q assume the positions $P_2$, $Q_2$ and the threads 41, 42 assume the respective positions 41-2, 42-2, the feed system 12 permitting the arrival of an additional length of these threads 41, 42. The thread 41-2 passes through the end $P_2$ and through the point J and the thread 42-2 passes through the end $Q_2$ and through the point K, the points J, K not having varied from one of these positions to the other since the rear clamp 5 remains closed and stationary. The straight line joining the points $P_1$, $P_2$ is parallel to the transverse direction and is therefore parallel to the straight line joining the points J, K. In the initial position, the straight line joining the points J, $P_1$ (position of the thread 41-1) and the straight line joining the points K, $Q_1$ (position of the thread 42-1) are oriented longitudinally in accordance with the arrow $F_1$ and they are therefore perpendicular to the straight lines JK, $P_1P_2$.

From FIG. 9 it can be seen that the straight line segment $JP_2$ (position of the thread 41-2 in the vicinity of the clamp 5) forms with the longitudinal direction an acute angle $\alpha_{41}$, which is greater than the acute angle $\alpha_{41}$ which the straight line segment $KQ_2$ (position of the thread 42-2 in the vicinity of the clamp 5) makes with this longitudinal direction. It follows from this that the nominal displacement ratio $T_n$ of the thread 41 is greater than the nominal displacement ratio $T_n$ of the thread 42 since $\alpha_{41}$ and $\alpha_{42}$ represent the angles formed by the threads 41 and 42 respectively with the longitudinal direction of the ply 40A, as shown in FIG. 8, assuming that each of the threads 2 of the ply 40A has the shape of a broken line formed by straight line segments 23, the longitudinal direction being indicated in dashed lines in this FIG. 8. A portion of the threads 41, 42 as deposited on the support 3 is shown in dashed line in FIG. 9.

Here again, due to the great precision of the nominal displacement ratios $T_n$ for the ply 40A, the latter, after shaping, gives a very uniform ply 40 which is characterized therefore by mechanical properties which are well-defined and in accord with what is desired.

Preferably, within a ply in which the threads 2 have a nominal displacement ratio $T_n$ which varies in accordance with the width, as for instance in the plies 40A previously described, this ratio $T_n$ is preferably greater than 1 and less than 3, the angle $\theta$ of inclination of the thread guide varying preferably from 0° to 60°.

Of course, the invention is not limited to the embodiments which have been described above. Thus, for instance, the decrease in the nominal displacement ratio $T_n$ of the reinforcement threads can be obtained by shaping articles other than pneumatic tires, for instance tubes or membranes, after having incorporated plies in accordance with the invention in said articles, vulcanization being effected, in particular, on these articles after shaping.

The invention also covers cases in which the decrease in the nominal displacement ratio $T_n$ is reversible, for instance in the case of a membrane formed by a ply in accordance with the invention the support of which is elastic, the deformation of this membrane, for instance under the effect of the pressure of a fluid, causing a decrease in said ratio but the threads resume their initial ratio $T_n$ when the membrane resumes its initial shape. This membrane, made for instance of vulcanized rubber, can serve, in particular, for the making, shaping or vulcanizing of pneumatic tires.

I claim:

1. A reinforcing ply comprising a rubber support and a plurality of reinforcement threads applied to an unvulcanized surface of the rubber support across its width, the threads having a sinuous shape with vertices, the amplitude of the undulation of each thread being less than the width of the ply, the variation in the displacement ratio T of each thread being at most equal to the nominal value $T_n$ plus or minus 5%, each thread forming vertices such that the straight-line segment joining any two successive vertices forms a practically constant acute angle $\alpha$ with the longitudinal direction of the ply, the displacement ratio T being defined by the relationship T equals L/D, L being the rectilinear distance between two successive vertices and 2D being the rectilinear distance between two vertices connected by the thread via another vertex.

2. A reinforcing ply comprising a rubber support and a plurality of reinforcement threads applied to an unvulcanized surface of the rubber support across its width, the threads having a sinuous shape with vertices, the amplitude of the undulation of each thread being less than the width of the ply, the variation in the displacement ratio T of each thread being at most equal to the nominal value $T_n$ plus or minus 5%, the nominal displacement ratio $T_n$ varying from one thread to the next, the displacement ratio T being defined by the relationship T equals L/D, L being the rectilinear distance between two successive vertices and 2D being the rectilinear distance between two vertices connected by the thread via another vertex.

3. A reinforcing ply comprising a rubber support and a plurality of reinforcement threads applied to a surface of the support across its width, the threads having a sinuous shape with vertices, the amplitude of the undulation of each thread being less than the width of the ply, the variation in the displacement ration T of each thread being at most equal to the nominal value $T_n$ plus or minus 5%, each thread forming vertices such that the straight-line segment joining any two successive vertices forms a practically constant acute angle $\alpha$ with the longitudinal direction of the ply, the displacement ratio T being defined by the relationship T= L/D, L being the rectilinear distance between two successive vertices and 2D being the rectilinear distance between two vertices connected by the thread via another vertex, the reinforcement ply being made by directing the thread and the support to front and rear clamps arranged in sequence along the direction of advance of the support, the clamps operating in a manner so that when they are open they are not in contact either with the support or with the thread and when they are closed they are in contact both with the support and with the thread, closing the rear clamp and displacing it in the direction of advance in such a manner as to cause the support and the thread to advance in said direction, the rear clamp moving away from the open front clamp, closing the front clamp, opening the rear clamp and displacing it in the direction opposite the direction of advance so as to bring the rear clamp towards the front clamp, and after opening the front clamp and closing the rear clamp, displacing the thread before it is applied to the support in directions transverse to the direction of advance in such a manner that the portion of the thread displaced extends from the rear clamp to upstream of the front clamp without the portion of the thread displaced being in contact with the support.

4. A reinforcing ply comprising a rubber support and a plurality of reinforcement threads applied to a surface of the support across its width, the threads having a sinuous shape with vertices, the amplitude of the undulation of each thread being less than the width of the ply, the variation in the displacement ratio T of each thread being at most equal to the nominal value $T_n$ plus or minus 5%, the nominal displacement ratio $T_n$ varying from one thread to the next, the displacement ratio T being defined by the relationship $T=L/D$, L being the rectilinear distance between two successive vertices and 2D being the rectilinear distance between two vertices connected by the thread via another vertex, the reinforcement ply being made by directing the thread and the support to front and rear clamps arranged in sequence along the direction of advance of the support, the clamps operating in a manner so that when they are open they are not in contact either with the support or with the thread and when they are closed they are in contact both with the support and with the thread, closing the rear clamp and displacing it in the direction of advance in such a manner as to cause the support and the thread to advance in said direction, the rear clamp moving away from the open front clamp, closing the front clamp, opening the rear clamp and displacing it in the direction opposite the direction of advance so as to bring the rear clamp towards the front clamp, and after opening the front clamp and closing the rear clamp, displacing the thread before it is applied to the support in directions transverse to the direction of advance in such a manner that the portion of the thread displaced extends from the rear clamp to upstream of the front clamp without the portion of the thread displaced being in contact with the support.

* * * * *

UNITED STATES PATENT AND TRADEMARK OFFICE
CERTIFICATE OF CORRECTION

PATENT NO. : 5,134,024
DATED : July 28, 1992
INVENTOR(S) : Carrier

It is certified that error appears in the above-identified patent and that said Letters Patent is hereby corrected as shown below:

Title page, Item 54, first line -- AND Col. 1, line 1, "PENUMATIC" should read --PNEUMATIC--.

Title page, 3rd-from-bottom line of ABSTRACT, "a reinforcing" should read --A reinforcing--.

Col. 9, line 39, "$\alpha_{41}$" should read --$\alpha_{42}$--.

Signed and Sealed this

Fifteenth Day of February, 1994

Attest:

BRUCE LEHMAN

Attesting Officer

Commissioner of Patents and Trademarks